United States Patent
Kawamuro et al.

(10) Patent No.: US 6,302,441 B1
(45) Date of Patent: *Oct. 16, 2001

(54) STEERING CONTROL METHOD AND APPARATUS

(75) Inventors: Junji Kawamuro; Morihiro Matsuda, both of Susono; Masahiko Shindo, Shizuoka-ken; Takahiro Kojo, Susono, all of (JP)

(73) Assignee: Toyota Jidosha Kabushiki Kaisha, Toyota (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/298,997

(22) Filed: Apr. 26, 1999

(30) Foreign Application Priority Data

May 28, 1998 (JP) .................................................. 10-147658

(51) Int. Cl.$^7$ ................................. B62D 1/00; B62D 3/02
(52) U.S. Cl. ...................... 280/771; 280/93.513; 701/42; 180/446
(58) Field of Search ........................ 701/42, 41; 280/771, 280/93.502, 93.513, 93.514, 93.515; 180/446, 443, 444

(56) References Cited

U.S. PATENT DOCUMENTS

| | | | |
|---|---|---|---|
| 3,772,962 | * 11/1973 | Suzuki | 91/359 |
| 4,658,927 | * 4/1987 | Kanazawa | 180/142 |
| 4,751,976 | * 6/1988 | Higuchi et al. | 180/446 |
| 4,932,492 | * 6/1990 | Sauvageot et al. | 180/446 |
| 5,174,407 | * 12/1992 | Shimizu et al. | 180/446 |
| 5,284,219 | * 2/1994 | Shimizu et al. | 180/446 |
| 5,333,700 | * 8/1994 | Mouri | 180/446 |
| 5,423,391 | * 6/1995 | Shimizu | 180/446 |
| 5,482,130 | * 1/1996 | Shimizu | 180/79.3 |
| 5,884,724 | * 3/1999 | Bohner et al. | 180/402 |
| 6,041,887 | * 3/2000 | Kojo et al. | 180/446 |
| 6,199,654 | * 3/2001 | Kojo et al. | 180/443 |
| 6,219,603 | * 4/2001 | Yamamoto et al. | 701/41 |

FOREIGN PATENT DOCUMENTS

A-62-46771   2/1987   (JP) .

* cited by examiner

*Primary Examiner*—Robert P. Olszewski
*Assistant Examiner*—Andrew J. Fischer
(74) *Attorney, Agent, or Firm*—Oliff & Berridge PLC (57) ABSTRACT

A base transmission ratio Gbase is determined according to the vehicle speed and a compensation amount α is determined for each of feed steering case and return steering case during acceleration/deceleration. Based on this, the transmission ratio G of a transmission ratio varying mechanism is set as G=Gbase+α.

17 Claims, 10 Drawing Sheets

| | FEED STEERING | RETURN STEERING |
|---|---|---|
| COMPENSATION AMOUNT $\alpha$ | $-\alpha_0$ | $\alpha_0$ |

Fig.7

| | COMPENSATION AMOUNT $\alpha$ | |
|---|---|---|
| | FEED STEERING | RETURN STEERING |
| DURING ACCELERATION | $-\alpha_1$ | $\alpha_2$ |
| DURING DECELERATION | $-\alpha_3$ | $\alpha_4$ |

STEERING CONTROL METHOD AND APPARATUS

BACKGROUND OF THE INVENTION

1. Field of Invention

The present invention relates to a steering control apparatus for a vehicle provided with a transmission ratio varying mechanism capable of varying the transmission ratio between the rotation of the steering wheel and the turn angle of the wheels.

2. Description of Related Art

There are known steering control apparatus for vehicles provided with a transmission ratio varying mechanism capable of varying the transmission ratio between the rotation of the steering wheel and the turn angle of the wheels. For example, in Japanese Laid-open Patent Application No. 62-46771, the responsiveness of the transmission ratio is changed according to the acceleration/ deceleration of the vehicle.

Specifically, the responsiveness of the wheels to the steering wheel is improved by keeping the transmission ratio high during acceleration, while stability of steering is enhanced by keeping the transmission ratio low during deceleration so as to reduce the quick alteration of transmission ratio with a reduction in vehicle speed.

SUMMARY OF THE INVENTION

When rounding a curve, steering is conducted in such a way that the steering handle (steering wheel) is rotated (for example right steering) in the cornering direction when entering the curve and the steering handle is then slowly returned (for example left steering) when entering the exit of the curve. In Japanese Laid-open Patent Application No. Sho 62-46771 consideration is not given to the steering operation when rounding a curve and to the change in the speed of the vehicle on that occasion, and so during cornering of the vehicle the responsivity of the transmission ratio varies based only on the accelerated/decelerated state of the vehicle. Therefore, it fails to set the transmission ratio correctly during cornering.

The present invention has solves this problem and provides a steering control apparatus for a vehicle that can correctly set the transmission ratio for the steering operation during cornering with acceleration or deceleration.

The steering control apparatus for a vehicle is an apparatus having a transmission ratio varying mechanism. The transmission ratio varying mechanism varies a transmission ratio of the rotation of the steering handle to the turn angle of the wheel. The steering control apparatus for vehicle has an accelerated/decelerated state judging means for judging whether a vehicle is in an accelerated/decelerated state, a steering state judging means for judging a steering state, based on the steering angle of the steering handle, a base transmission ratio determining means for determining a base transmission ratio according to the running condition of the vehicle, a compensation amount determining means for, when the accelerated/decelerated state judging means judges that the vehicle is in acceleration/deceleration, determining a compensation amount for the base transmission ratio, based on the result of judgment of the steering state judging means and a transmission ratio setting means for setting a transmission ratio of the transmission ratio varying mechanism, based on values determined by the base transmission ratio determining means and the compensation amount determining means.

The accelerated/decelerated state judging means judges, for example, whether the vehicle is in acceleration or in deceleration, and the steering state judging means judges, for example, whether steering is feed steering or return steering. The compensation amount determining means determines the compensation amount for the base transmission ratio in view of the accelerated/decelerated state of the vehicle and the steering state thus judged.

The steering control apparatus for vehicle according to the above, wherein the compensation amount determining means determines the compensation amount so as to decrease the base transmission ratio state during acceleration/deceleration and feed steering or so as to increase the base transmission ratio where the steering state during acceleration/deceleration and return steering.

By determining the compensation amount in this way, the base transmission ratio is compensated so as to be quicker (or so as to make the rotation amount to the turn of the wheel amount larger) in the case of feed steering during acceleration/deceleration. In the case of return steering during acceleration/deceleration the base transmission ratio is compensated so as to be slower (or so as to make the rotation amount to turn of the wheel amount smaller), which acts to direct a turn angle of the wheels more toward the neutral position (straight driving position). This reduces the steering amount during return steering. Accordingly, the compensation amount by the compensation amount determining means allows running through the curve with less steering of the steering handle.

The steering control apparatus for a vehicle as noted above, further comprising slow change means for slowly changing the transmission ratio set by the transmission ratio setting means with a lapse of time at the start of compensation and at the end of compensation, for the base transmission ratio. At the start of compensation and at the end of compensation the transmission ratio set by the transmission ratio setting means may vary suddenly because of influence of the compensation amount. Intervention of the slow change means can suppress the sudden change of transmission ratio.

The steering control apparatus for vehicle according to the above, wherein the compensation amount determining means determines the compensation amount according to whether the steering state is feeding steering during acceleration, return steering during acceleration, feed steering during deceleration and return steering during deceleration. When the compensation amount is determined according to each steering state in this way, the transmission ratio can be set so as to be suited for each steering state during acceleration/deceleration.

The steering control apparatus for a vehicle according to the above, wherein the compensation amount determining means has inhibiting means for inhibiting alteration of the compensation amount where the steering angle change amount is smaller than a predetermined threshold. The addition of this inhibiting means permits a constant cornering state to be maintained without reacting to minute steering fluctuations during cornering.

The steering control apparatus for a vehicle according to the above, also having threshold setting means for setting the threshold in the inhibiting means according to a running condition of the vehicle.

The threshold in the inhibiting means is a threshold value for judging whether the steering handle is in a hold state. On the other hand, the transmission ratio, which specifies the relation between the steering angle of the steering handle and the turn angle of the wheels, varies according to the running condition of the vehicle. When the threshold in this inhibiting means is thus set according to the running condition of the vehicle, the judgment can be more accurate as to whether the steering is in the hold state, i.e., whether the compensation amount should be changed.

The steering control apparatus for vehicle is the steering control apparatus for vehicle according to the above, wherein the compensation amount determining means further comprises adjusting means for changing the compensation amount according to the magnitude of an acceleration or a deceleration. The provision of this adjusting means can change the transmission ratio more promptly or, conversely, to suppress a sudden change of transmission ratio, with increase in the acceleration/deceleration of the vehicle.

The steering control apparatus for a vehicle according to the above, wherein the compensation amount determining means also has adjusting means for changing the compensation amount according to the magnitude of the speed of the vehicle. The addition of this adjusting means can prevent the transmission ratio from changing too much in the high speed range.

The steering control apparatus for a vehicle according to the above, wherein the compensation amount determining means also includes adjusting means for changing the compensation amount according to the speed of rotation of the steering handle. A rapid rotation of the steering handle is a situation in which the driver desires the cornering state of the vehicle to change quickly. When the adjusting means adjusts the compensation amount so as to increase with increasing steering speed for example, the steering amount of the steering handle can be reduced during quick steering, and the transmission ratio can be set so as to reflect the driver's intention for the wheels to turn quicker.

The present invention will be more fully understood from the detailed description below and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 8 is a flowchart showing another embodiment concerning setting of compensation amount a.

DETAILED DESCRIPTION OF PREFERRED EMBODIMENTS

Embodiments of the present invention will be described with reference to the accompanying drawings.

Figure 1:
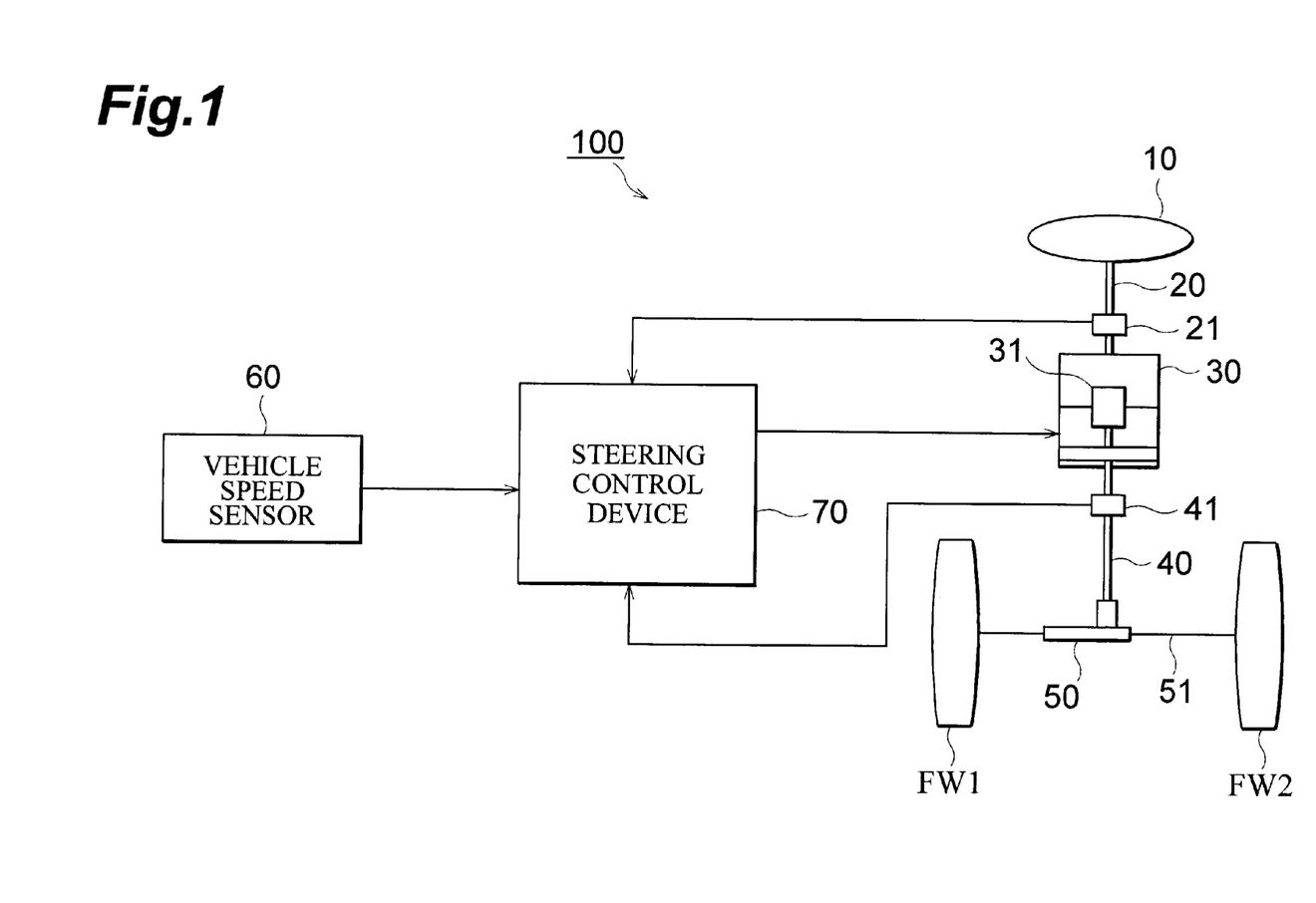
FIG. 1 is a block diagram showing the overall structure of the steering apparatus.

FIG. 1 shows the structure of steering apparatus 100 according to an embodiment. An input shaft 20 is connected to an output shaft 40 through a transmission ratio varying mechanism 30 and a steering handle (i.e. steering wheel) 10 is connected to the input shaft 20. The output shaft 40 is connected through a rack-and-pinion type gear system 50 to a rack shaft 51 and wheels FW1, FW2 are connected to both ends of the rack shaft 51.

The input shaft 20 is equipped with an input angle sensor 21 for detecting a steering position of the steering handle 10, and the output shaft 40 with an output angle sensor 41 for detecting a rotational position of the output shaft 40. This rotational angle of the output shaft 40 corresponds to a stroke position of the rack shaft 51, and the stroke position of the rack shaft 51 to a turn angle of the wheels FW1, FW2. Thus, the turn angle of the wheels FW1, FW2 is detected by detecting the rotational angle of the output shaft 40 by the output angle sensor 41.

Figure 2:
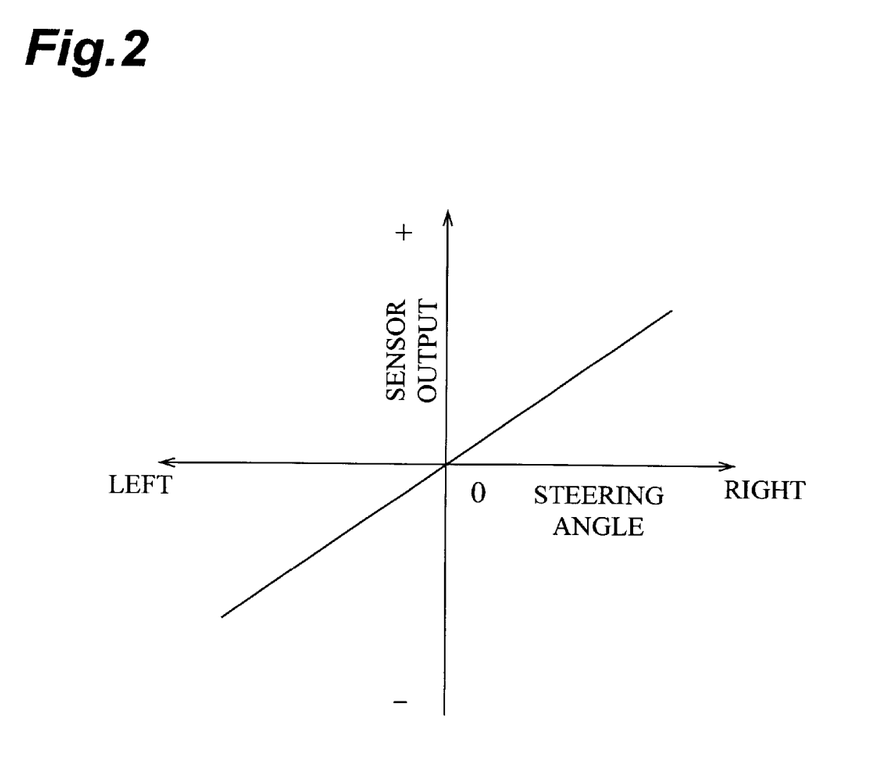
FIG. 2 is a graph showing the relationship between the sensor output of the input angle sensor and the steering angle of the steering handle.

The relation between the sensor output of the input angle sensor 21 to indicate the input angle θh and the actual steering angle of the steering handle 10 is, for example, as illustrated in FIG. 2. Therefore, the sensor output is 0 at the neutral position, the sensor output increases when the steering angle is turned from the neutral position to the right, and the sensor output decreases when the steering angle is turned to the left.

The transmission ratio varying mechanism 30 is provided with a gear mechanism for connecting the input shaft 20 to the output shaft 40 and is constructed in such structure that the transmission ratio G (G=steering angle/turn angle) between the steering angle of the steering handle 10 and the turn angle of the wheels FW1, FW2 is varied by driving this gear mechanism by actuator 31.

Control of driving of this transmission ratio varying mechanism 30 is carried out by steering control device 70. The steering control device 70 receives detection signals from the input angle sensor 21, from the output angle sensor 41, and from vehicle speed sensor 60, and sets a transmission ratio based on these signals, and then executes the control of the transmission ratio varying mechanism 30 according to the transmission ratio thus set.

Several processes carried out in the steering control device 70 are described below.

The flowchart of FIG. 3, indicated by step (step will be referred to hereinafter as "S") 100, represents the main routine executed in the steering control device 70. Principal processing in this main routine is to first set the transmission ratio G of the transmission ratio varying mechanism 30, based on a base transmission value Gbase according to the vehicle speed V and based on a compensation amount α set according to a steering state and an accelerated/decelerated state of the vehicle. Then, based on the transmission ratio G thus set, the control of driving of the actuator 31 is carried out according to an input angle θh of the steering handle 10.

The processing will be described in order along the flowchart of FIG. 3. The flowchart indicated by S100 is started by on operation of the ignition switch. After the start of S100, the flow first goes to S102 to read each of values of the input angle θh detected by the input angle sensor 21, the output angle θp detected by the output angle sensor 41, and the vehicle speed V detected by the speed sensor 60.

Then S104 judges whether the value of |V−Vold| is larger than a preset threshold Vth, based on the vehicle speed V acquired in S102 and another vehicle speed Vold stored in a preceding routine. When judgment is "No" in S104, the flow proceeds to S106 to set the compensation amount α=0 under the assumption that the vehicle is running at a constant speed. When judgment is "Yes" in S104, the flow moves to the setting process of the compensation amount a indicated by S200 with the determination that the vehicle is in acceleration or in deceleration. This setting process of the compensation amount α will be described hereinafter in detail.

After passing through S106 or S102, the flow goes to S108 to set the base transmission ratio Gbase of the transmission ratio varying mechanism 30. Specifically, the base transmission ratio Gbase according to the vehicle speed V acquired in S102 is set based on the graph which defines the relation between the vehicle speed V and the base transmission ratio Gbase, illustrated in FIG. 4.

In the next S110, Gbase+α is computed based on the base transmission ratio Gbase set in S108 and the compensation amount a set in S106 or in S200 and the computation result is set as a transmission ratio G of the transmission ratio varying mechanism 30.

In the next S112, θpm=(1/G)·θh is computed, based on the transmission ratio G thus set and the input angle θh read in S102, to set a target value of output angle θpm representing a target rotational angle of the actuator 31. In the next S114, a deviation A between the output angle target value θpm set in S112 and the output angle θp read in S102 is computed according to e=θpm−θp.

In the next S116, a control signal Is to control the actuator 31 is determined so as to null the deviation e without an overshoot. An example of this processing is such that the control signal Is can be determined according to the operation expression of Is=C(s)·e by properly setting the parameters of PID control. In the expression, "s" is the Laplace operator.

In the next S118, the control signal Is is determined in S116 is outputted to the actuator 31 to drive the actuator 31 according to the control signal Is.

In the next S120, the values of the input angle θh and the vehicle speed V acquired in the current routine are stored as θhold and Vold, respectively, and the value of the compensation amount α for the base transmission ratio Gbase, set in S106 or in S200, is stored as αold.

After this, the flow goes to S122 to judge whether the ignition switch (IG) is turned off. With "No" the flow returns to S102 to repetitively execute the aforementioned processes in and after S102 until the judgment of "Yes" is made in S122.

Next, the setting process of the compensation amount α indicated by S200 will be described in order along the flowchart of FIG. 5. The flow first goes to S202 to compare the input angle θh acquired in S102 with the input angle θhold acquired in the preceding routine and to judge whether a value of |θh−θhold| is larger than a predetermined threshold θth.

When judgment is "Yes" in S202, the flow proceeds to S204 to judge whether the value of the input angle θh acquired in S102 is not less than 0. Referring to FIG. 2 described previously, the judgment of "Yes" here means right steering or rotating the steering handle 10 to the right, while the judgment of "No" here means left steering or rotating the steering handle 10 to the left.

When judgment is "Yes" in S204, i.e., in the case of the right steering, the flow goes to S206 to, judge whether the input angle θh is greater than the input angle θhold. When judgment is "Yes" in S206, the input angle θh is further increasing in the right steering and this steering state is feed steering to the right. Therefore, the flow goes to S208 to make judgment of "feed steering." When judgment is "No" in S206, the input angle θh is decreasing in the right steering and this steering state is return steering toward the neutral position of steering angle. Thus the flow goes to S210 to make the judgment of "return steering."

Likewise, when judgment is "No" in S204, i.e., in the case of the left steering, the flow goes to S212 to judge whether the input angle θh is less than the input angle θhold. With judgment of "Yes" the flow goes to S208 to make judgment of "feed steering," while with judgment of "No" the flow goes to S210 to make judgment of "return steering."

After the judgment on the steering state is made through either S208 or S210 in this way, the flow goes to S300 to set the compensation amount α according to the steering state thus determined.

Figure 6:
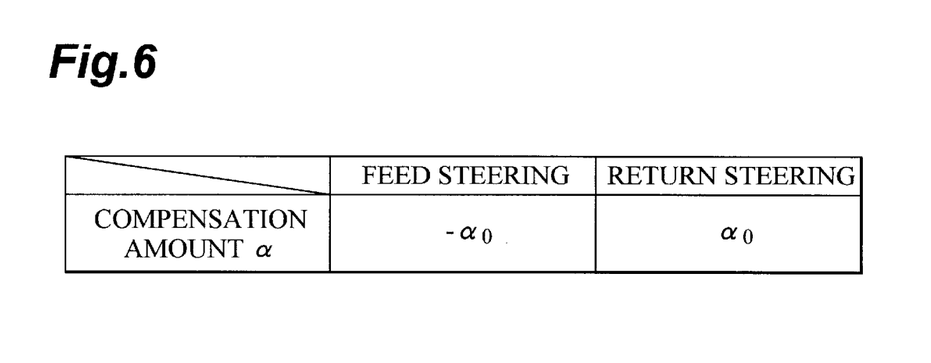
FIG. 6 is a table showing compensation amounts in the respective steering states.

In S300, for example, referring to the table of FIG. 6, the compensation amount α is set to $-\alpha_0$ ($\alpha_0$ is a positive value) in the case of the feed steering, whereas the compensation amount αis set to $\alpha_0$ in the case of the return steering. In the case of the feed steering during acceleration/deceleration, the base transmission ratio Gbase is thus compensated so as to be quicker (or so as to make the rotation amount to steering amount larger), which can decrease the steering amount needed during the feed steering.

In the case of the return steering during acceleration, the base transmission ratio Gbase is compensated so as to be slower (or so as to make the rotation amount to steering amount smaller), which acts to direct the turn angle of the wheels to the same steering angle more to the neutral position (straight driving position) and which can decrease the steering amount needed during the return steering.

In the case of return steering during deceleration, the base transmission ratio Gbase is compensated so as to be slower (or so as to make the rotation amount to steering amount smaller), which acts to direct the turn angle of the wheels more to the neutral position (straight driving position) and which can decrease the steering amount of the steering handle during the return steering. Further, in this case, because the number of degrees of side-to-side swivel of the wheels in contact with the road decreases for a given amount of rotation by the steering wheel, the handling characteristics of the vehicle will be improved.

Driving operation is often such that the rotation of steering handle 10 needs to be reduced when decelerating the vehicle at the entrance of a curve and the rotation of steering handle 10 needs to be reduced while accelerating the vehicle at the exit of the curve. When the compensation amount α is set according to the steering state during acceleration/deceleration in the above-stated manner, it acts to decrease the steering amount of the steering handle at both the entrance of the curve and at the exit of the curve, which permits running through the curve with less steering amount of the steering handle.

The process to set the compensation amount a in S300 in this way is carried out when judgment is "Yes" in S202, i.e., when the feed steering or the return steering is under way. When judgment is "No" in S202, i.e., when the steering state is the hold state, the flow goes to S214 to again set the value of the compensation amount αold set in the preceding routine, as the compensation amount α, and the routine of S200 is terminated. This processing inhibits alteration of the compensation amount α when the steering state is minute steering which is treated as a hold state while accelerating or decelerating. This can maintain the cornering state without reacting to minute steering during cornering.

Figure 7:
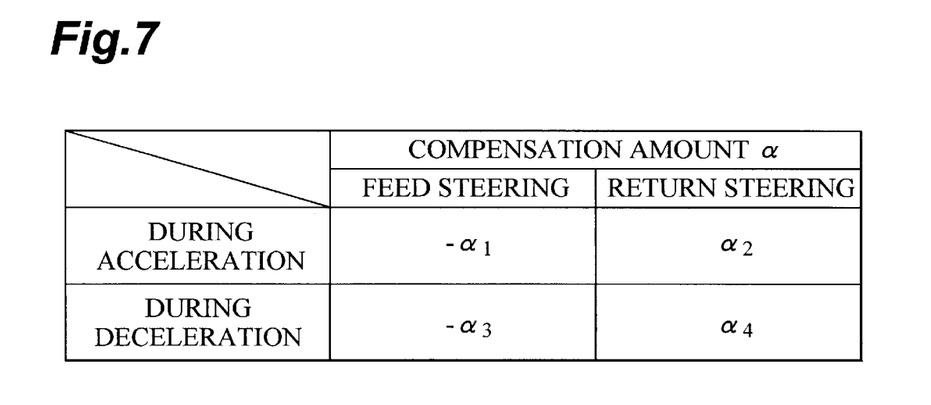
FIG. 7 is a table showing compensation amounts according to the respective steering states during acceleration/deceleration.

In S300 the compensation amount α can also be set based on the table of FIG. 7. Specifically, the compensation amount α is set to $-\alpha_1$ ($\alpha_1$ is a positive value) in the case of the feed steering during acceleration, while the compensation amount α is set to $\alpha_2$ ($\alpha_2$ is a positive value) in the case of the return steering during acceleration. On the other hand, the compensation amount α is set to $-\alpha_3$ ($\alpha_3$ is a positive value) in the case of the feed steering during deceleration, while the compensation amount α is set to $\alpha_4$ ($\alpha_4$ is a positive value) in the case of the return steering during deceleration. The individual values of the compensation amount α can be set according to the steering states during acceleration/deceleration as described above, whereby the transmission ratio can be set so as to be well suited for each steering state during acceleration/deceleration. On this occasion, for example, during deceleration, the value of $\alpha_3$ in the feed steering is set to be smaller than $\alpha_4$ in the return steering. This setting can suppress the phenomenon that the wheels FW1, FW2 are oversteered in the feed steering during deceleration, so as to prevent the so-called enfolding action in which the wheels FW1, FW2 are turned more than expected.

Figure 8:
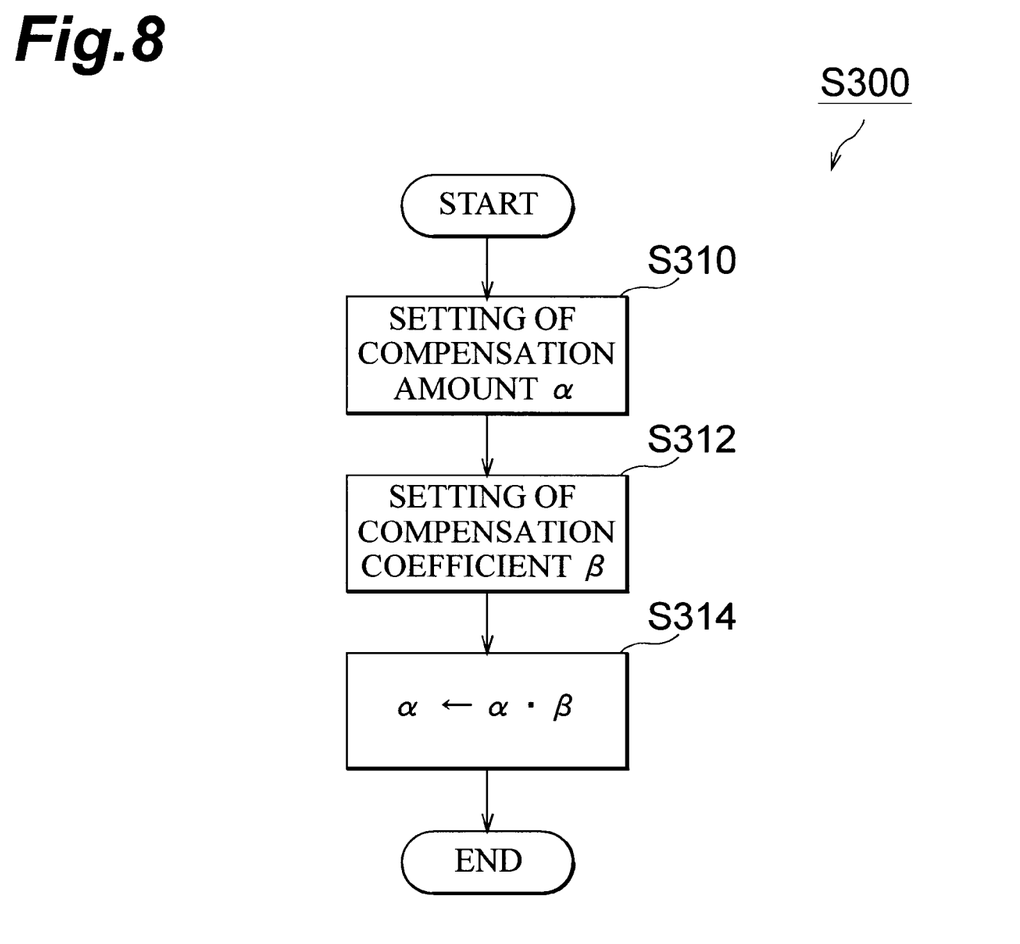

S300 can also be adapted to set the compensation amount α by executing the process illustrated in the flowchart of FIG. 8. In S310 the compensation amount α is first set based on FIG. 6 or FIG. 7 described above and in subsequent S312 a compensation coefficient β is set. This compensation coefficient β is a coefficient for adjusting the compensation amount α set in S310, for example based on the graph illustrated in FIG. 9, the compensation coefficient β is set depending upon an acceleration or a deceleration of the vehicle, which is a changing rate of the vehicle speed V. In next S314 α·β is then computed using the compensation amount α and compensation coefficient β set in S310 and S312 and the computation result is set as a compensation amount α.

Figure 9:
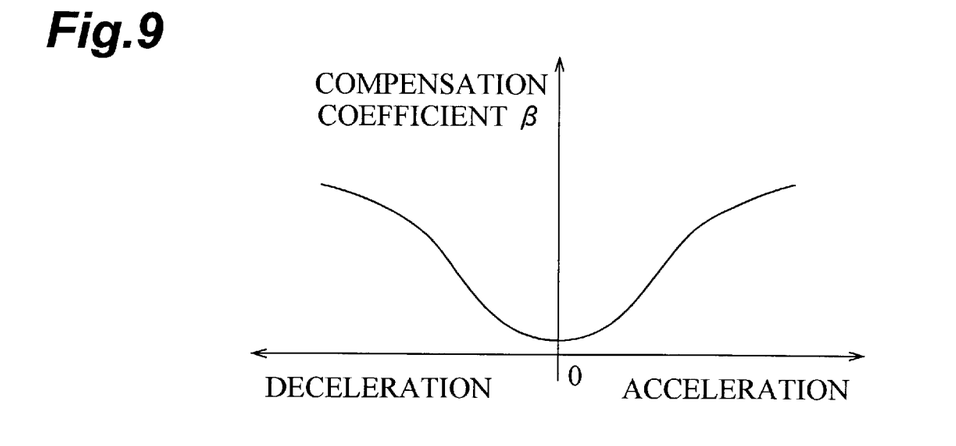
FIG. 9 is a graph specifying the relationship between acceleration/deceleration of the vehicle and compensation coefficient β.

This setting of the value of compensation coefficient β based on the graph of FIG. 9 effects such adjustment that absolute values of compensation amount α at large accelerations/decelerations of the vehicle are set to be larger than those at small accelerations/decelerations. Thanks to this adjustment, in the case of the feed steering during acceleration/deceleration, the transmission ratio G is set to be quicker at large accelerations/decelerations; in the case of the return steering during acceleration/deceleration, the transmission ratio G is set to be slower at large accelerations/decelerations. This can decrease the steering amount of the steering handle in the case of the feed steering and the return steering during accelerations/deceleration.

Conversely, the compensation coefficient β may be set to decrease with increasing acceleration/deceleration of the vehicle, and this setting effects such adjustment as to suppress sudden change of the compensation amount α in the large acceleration/deceleration region of the vehicle, so as to restrain excessive change of the transmission ratio G in the large acceleration/deceleration region.

Figure 10:
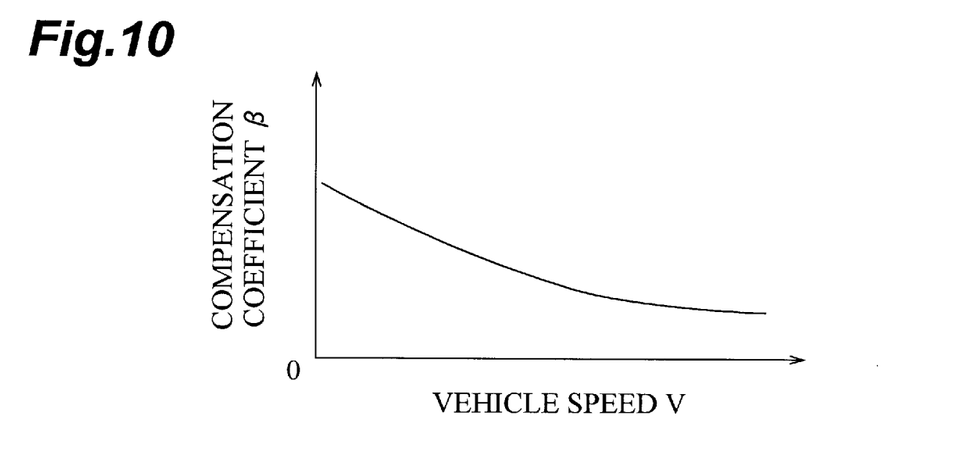
FIG. 10 is a graph specifying the relationship between vehicle speed V and compensation coefficient β.
Figure 11:
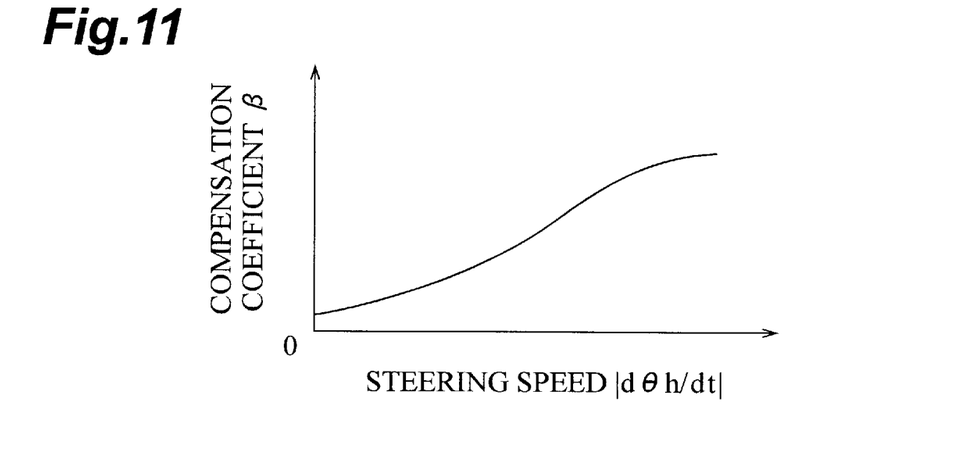
FIG. 11 is a graph specifying the relationship between steering speed |dθh/dt| and compensation coefficient β.

The setting process of the compensation coefficient β, shown in S312 can set the compensation coefficient according to the magnitude of the vehicle speed V, based on the graph illustrated in FIG. 10, or can set the compensation coefficient according to the magnitude of a steering speed |dθh/dt| of the steering handle 10, based on the graph illustrated in FIG. 11. When the compensation coefficient β is set so as to decrease with increasing vehicle speed V as illustrated in FIG. 10, absolute values of compensation amount α are adjusted to be smaller, in the high vehicle speed range, whereby a change amount of the transmission ratio G can be controlled in the high vehicle speed range. When the compensation coefficient β is set so as to increase with increasing steering speed |dθh/dt| as illustrated in FIG. 11, the compensation amount α can be adjusted so as to increase with quicker manipulation of the steering handle 10. Thanks to this adjustment, the transmission ratio G is set so as to be quicker during the feed steering or so as to be slower during the return steering, depending upon the magnitude of the steering speed |dθh/dt|. This setting can decrease the steering amount of the steering handle on the occasion of abrupt steering, and the transmission ratio G can be set so as to reflect the driver's intention of steering to desire the wheels FW1, FW2 to turn quicker.

Figure 3:
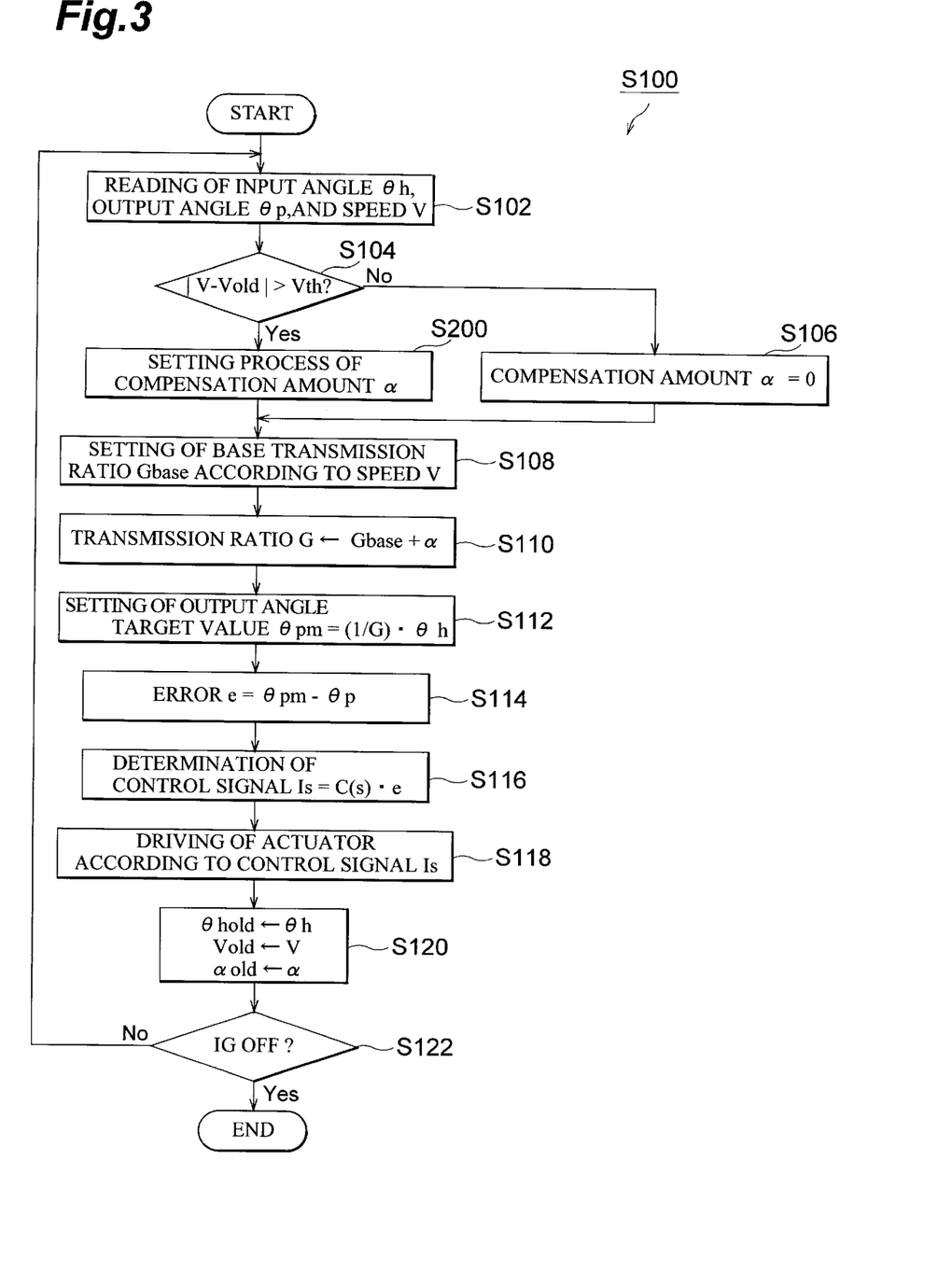
FIG. 3 is a flowchart to show the main routine executed in the steering control device.

As described above, the compensation amount α is set in S200 shown in FIG. 3, but, at the start of compensation and at the end of compensation for the base transmission ratio Gbase, the influence of the compensation amount α may cause sudden change in the value of transmission ratio G in some cases. In order to avoid it, a slow change process is executed to slowly change the transmission ratio G.

Figure 12:
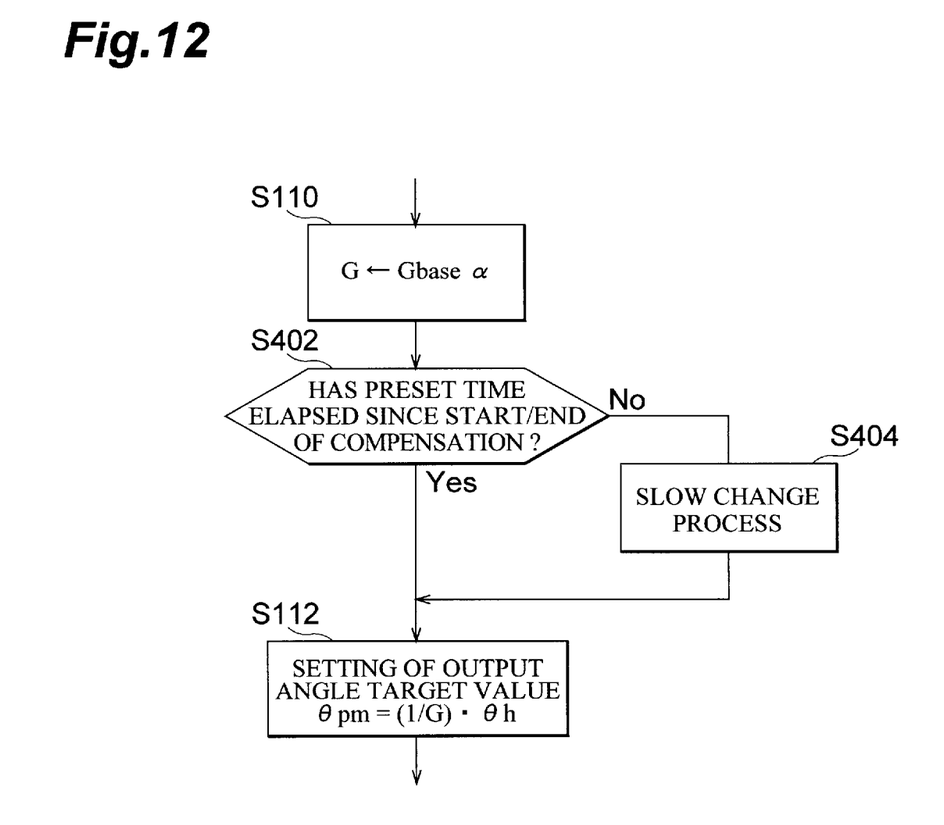
FIG. 12 is a flowchart showing another embodiment concerning setting of transmission ratio G.

For carrying out this slow change process in the main routine indicated by S100, for example as illustrated in FIG. 12, after the transmission ratio G is set in S110, the flow proceeds to S402 to judge whether a predetermined time has elapsed from the compensation start or the compensation end. This predetermined time is a time preliminarily specified as a sufficient time for slow transition of the transmission ratio G from the characteristics without compensation to the characteristics with compensation or from the characteristics with compensation to the characteristics without compensation.

When judgment is "Yes" in S402, the flow thus proceeds to S112 to compute the output angle target value θpm using the transmission ratio G set in S110. On the other hand, when judgment is "No" in S402, the flow proceeds to S404 to move into the slow change process to slowly change the transmission ratio G. This slow change process is, for example, to compute G=s·G0+(1−s)·Gold, where G0 is the transmission ratio set in S110, "s" is a distribution constant to satisfy 0<s<1, and Gold is the transmission ratio set in the preceding routine, and to set the computation result as the transmission ratio G to be set in the current routine. The apparatus can also employ other techniques for this slow change process as long as they are techniques for providing a lag module against change of transmission ratio G, such as a technique of interposing a low-pass filter.

Figure 13:
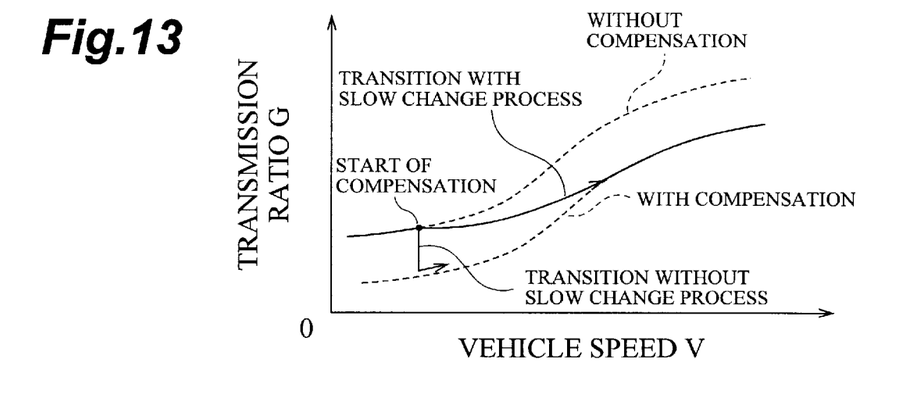
FIG. 13 is a graph showing the transition of transmission ratio G against the change in vehicle speed with and without the slow change process when feed steering during acceleration.
Figure 14:
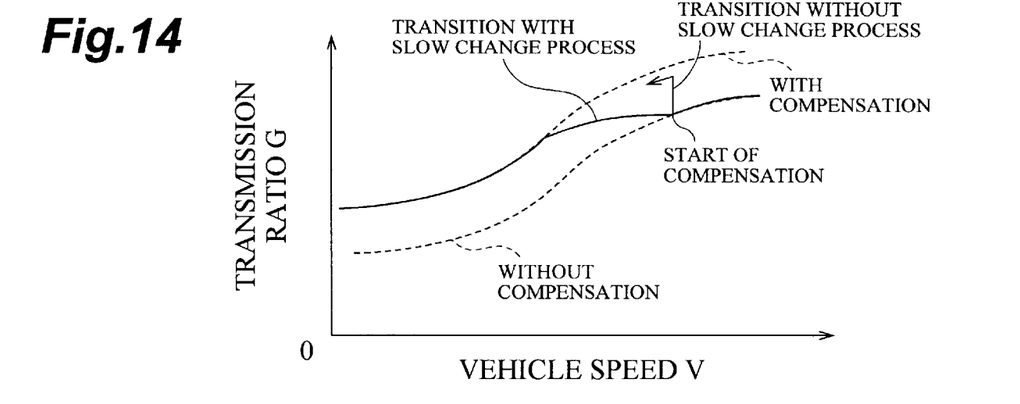
FIG. 14 is a graph showing the transition of transmission ratio G against the change in vehicle speed with and without the slow change process when return steering during deceleration.

When this slow change process is not carried out, the values of transmission ratio G decrease suddenly at the compensation start in the feed steering during acceleration as illustrated in FIG. 13. When the slow change process described above is carried out, the values of transmission ratio G are changed so as to slowly transfer from the characteristics without compensation to the characteristics with compensation after the compensation start. In the case of the return steering during deceleration, the values of transmission ratio G increase suddenly at the compensation start without execution of the slow change process, as illustrated in FIG. 14; with execution of the slow change process described above, the values of transmission ratio G are changed so as to slowly transfer from the characteristics without compensation to the characteristics with compensation after the compensation start. Although not illustrated, the values of transmission ratio G are also changed so as to slowly transfer similarly in the other steering states during acceleration/deceleration and at the compensation end.

In this way the execution of S402 and S404 between S110 and S112 can suppress the sudden change of transmission ratio G at the start and the end of compensation.

This slow change process can also be effected on the compensation amount α, as well as on the transmission ratio G. In this case, for example, S402 and S404 described above are carried out after S300 in the flowchart of FIG. 5.

As this slow change process, the substantially equivalent effect can be demonstrated by providing a lag module for the judgment process of steering direction in S206 and S212.

Figure 4:
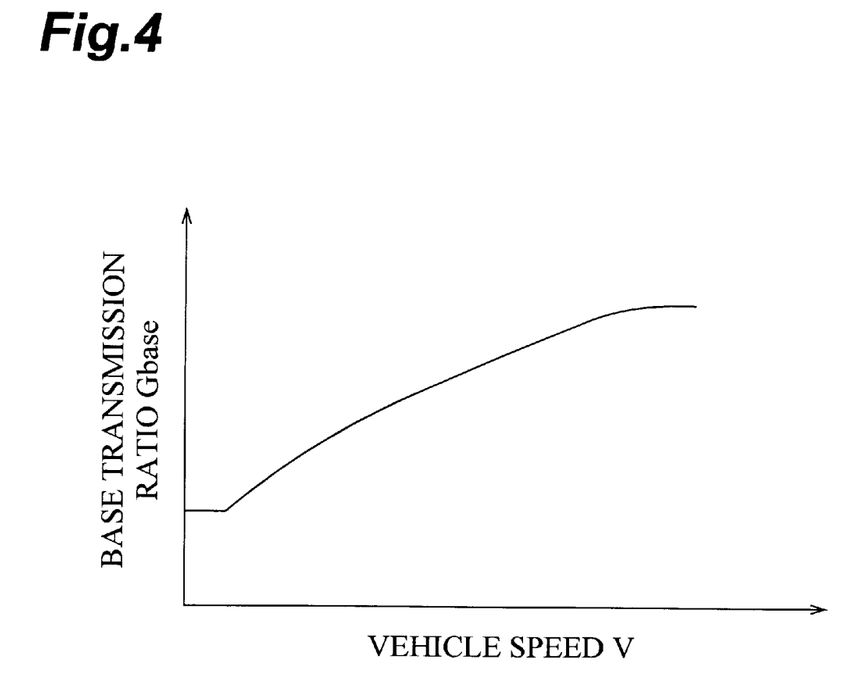
FIG. 4 is a graph showing the relationship between vehicle speed V and base transmission ratio Gbase.
Figure 5:
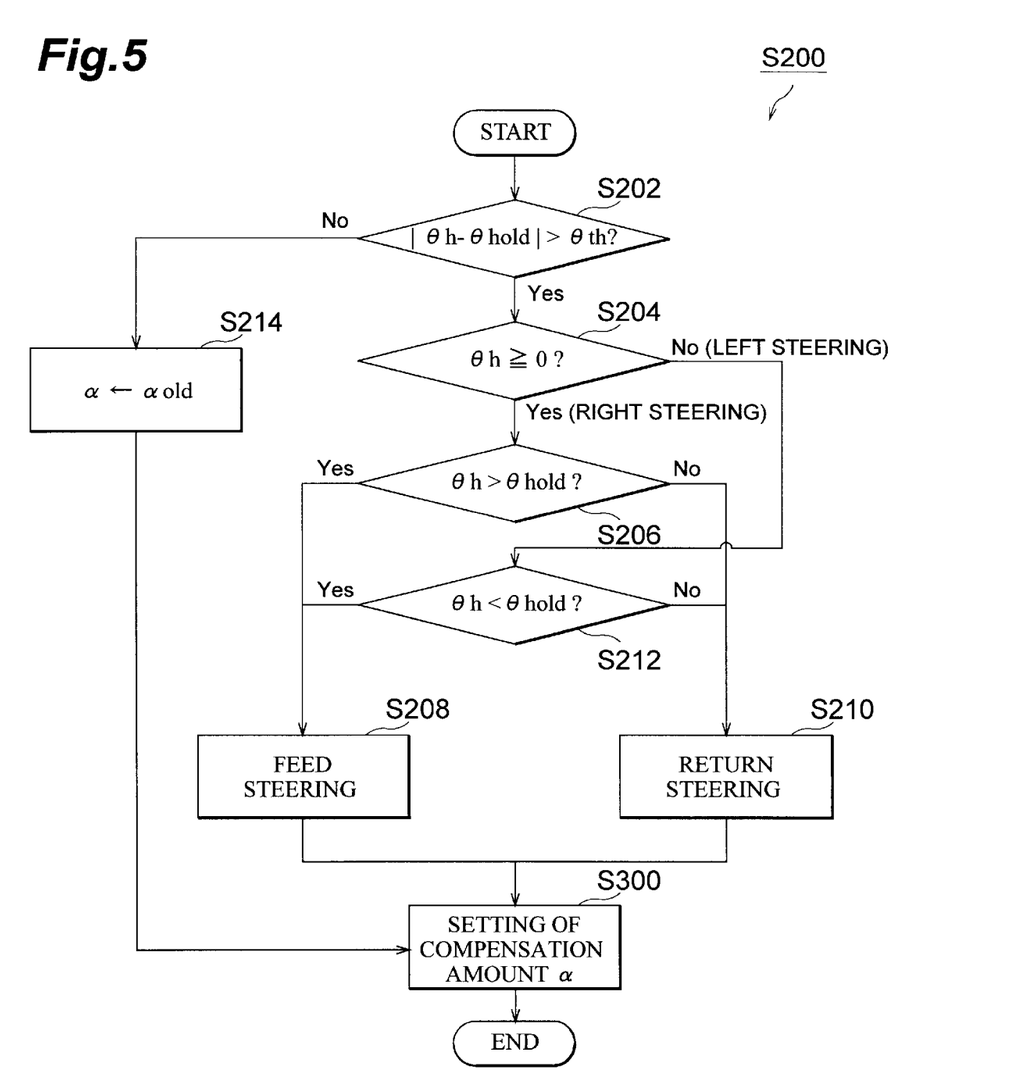
FIG. 5 is a flowchart showing the setting process of compensation amount α.
Figure 15:
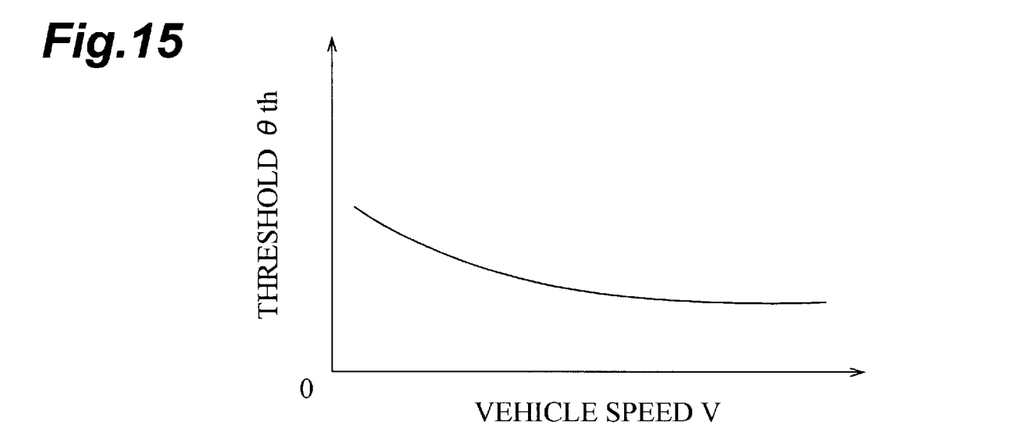
FIG. 15 is a graph to specify the relationship between vehicle speed V and threshold θh.

In the above-stated embodiments S202 in FIG. 5 was to make judgment of the steering hold state when the value of |θh−θhold| was not more than the threshold θth, but values of the threshold θth as a criterion for this judgment can also be set according to the magnitude of the vehicle speed V so that the values of the threshold θth decrease with increasing speed V, as illustrated in the graph of FIG. 15. This is based on the following; as illustrated in FIG. 4 before, the base transmission ratio Gbase, specifying the relation between the steering angle of the steering handle 10 and the turn angle of the wheels FW1, FW2, varies according to the vehicle speed V, and by changing the values of threshold θth for judging whether the steering is in the hold state or not according to the vehicle speed V, the judgment can be made so as to be better suited for the actual turning state of the wheels FW1, FW2, as to whether the steering is in the hold state or not, i.e., as to whether the compensation amount α should be changed.

The embodiments described above showed the examples wherein the vehicle speed V was detected as a running condition of the vehicle and wherein the base transmission ratio Gbase was set according to the speed V, but the apparatus can also be modified in such a maimer that the vehicle speed V and input angle θh are detected as running conditions of the vehicle and that the base transmission ratio Gbase is set according to the speed V and input angle θh.

As detailed above, each of the steering control apparatus for vehicle is so adapted that the compensation amount determining means determines the compensation amount for the base transmission ratio, based on the steering state, in the accelerated/decelerated state of the vehicle and that the transmission ratio setting means sets the transmission ratio of the transmission ratio varying mechanism, based on the compensation amount thus determined and the base transmission ratio. Therefore, the transmission ratio is set according to the accelerated/decelerated state and the steering state of the vehicle, whereby the transmission ratio can be set so as to be well suited for the steering operation during cornering with acceleration or deceleration.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A steering control apparatus, comprising:
    a transmission ratio varying mechanism that varies a transmission ratio of a steering angle of a steering handle to a turn angle of a wheel, wherein the steering handle and the wheel are connected via an input shaft connected to the steering handle and an output shaft connected to the wheel, the mechanism capable of varying an amount of angular rotation of the output shaft relative to an amount of angular rotation of the input shaft, the mechanism connecting with and arranged between the input and output shafts, the mechanism including an actuator for varying the transmission ratio when the actuator is driven;
    a state judging means that judges whether a vehicle is accelerating, decelerating or constant;
    a steering state judging means that judges a steering state, based on the steering angle of the steering handle;
    a base transmission ratio determining means that determines a base transmission ratio according to a running condition of the vehicle;
    a compensation amount determining means that, when the state judging means judges that the vehicle is in acceleration or deceleration, determines a compensation amount for the base transmission ratio, based on whether the steering state is feed steering during acceleration, return steering during acceleration, feed steering during deceleration, and return steering during deceleration so as to decrease the base transmission ratio during acceleration/deceleration and feed steering or so as to increase the base transmission ratio during acceleration/deceleration and return steering; and
    a transmission ratio setting means that sets a transmission ratio of the transmission ratio varying mechanism, based on values determined by the base transmission ratio determining means and the compensation amount determining means.

2. The steering control apparatus according to claim 1, further comprising: a slow change means that slowly changes the transmission ratio set by the transmission ratio setting means with a lapse of time at a start of compensation and at an end of compensation for the base transmission ratio.

3. The steering control apparatus according to claim 1, wherein the compensation amount determining means further comprises:
    an inhibiting means that inhibits alteration of the compensation amount where a change amount of the steering angle is smaller than a predetermined threshold.

4. The steering control apparatus according to claim 3, further comprising:
    a threshold setting means that sets the threshold according to the running condition of the vehicle.

5. The steering control apparatus according to claim 1, wherein the compensation amount determining means further comprises:

an adjusting means that changes the compensation amount according to the magnitude of an acceleration or a deceleration.

6. The steering control apparatus according to claim 1, wherein the compensation amount determining means further comprises:

an adjusting means that changes the compensation amount according to the magnitude of a speed of the vehicle.

7. The steering control apparatus according to claim 1, wherein said compensation amount determining means further comprises:

an adjusting means that changes the compensation amount according to a magnitude of a steering speed.

8. A vehicle, comprising:

the steering control apparatus according to claim 1.

9. A method of steering control, comprising:

judging whether a vehicle is accelerating, decelerating or constant;

judging a steering state, based on a steering angle of a steering handle;

determining a base transmission ratio according to a running condition of the vehicle;

determining, when the vehicle is in acceleration or deceleration, a compensation amount for the base transmission ratio, based on whether the steering state is feed steering during acceleration, return steering during acceleration, feed steering during deceleration, and return steering during deceleration; and setting a transmission ratio, based on the base transmission ratio and the compensation amount.

10. The method of steering control, according to claim 9, wherein the compensation amount decreases the base transmission ratio during acceleration or deceleration and feed steering or increases the base transmission ratio during acceleration or deceleration and return steering.

11. The method of steering control according to claim 9, wherein the setting the transmission ration slowly changes the transmission ratio with a lapse of time at a start of compensation and at an end of compensation from the base transmission ratio.

12. The method of steering control according to claim 9, wherein the compensation further comprises the step of:

inhibiting alteration of the compensation amount when a change amount of the steering angle is smaller than a predetermined threshold.

13. The method of steering control according to claim 12, further comprising the step of:

setting the threshold according to a running condition of the vehicle.

14. The method of steering control according to claim 9, wherein the compensation amount determining further comprises the step of:

adjusting the compensation amount according to the magnitude of an acceleration or a deceleration.

15. The method of steering control according to claim 9, wherein the compensation amount determining further comprises the step of:

adjusting the compensation amount according to the magnitude of a speed of the vehicle.

16. The method of steering control according to claim 9, wherein said compensation amount determining further comprises the steps of:

adjusting compensation amount according to a magnitude of a steering speed.

17. A method of steering a vehicle, comprising:

utilizing the method of steering control according to claim 9.

* * * * *

UNITED STATES PATENT AND TRADEMARK OFFICE
CERTIFICATE OF CORRECTION

PATENT NO. : 6,302,441 B1
DATED : October 16, 2001
INVENTOR(S) : Junji Kawamuro et al.

It is certified that error appears in the above-identified patent and that said Letters Patent is hereby corrected as shown below:

<u>Title page, Item [54] and Column 1, lines 1-2,</u>
Correct the title as follows:

-- STEERING CONTROL APPARATUS FOR VEHICLE --

Signed and Sealed this

Eighteenth Day of June, 2002

*Attest:*

*Attesting Officer*

JAMES E. ROGAN
*Director of the United States Patent and Trademark Office*